US011226391B2

(12) United States Patent
Luomi et al.

(10) Patent No.: US 11,226,391 B2
(45) Date of Patent: Jan. 18, 2022

(54) FLOOR LEVELS OF A VENUE

(71) Applicant: HERE Global B.V., Eindhoven (NL)

(72) Inventors: Marko Luomi, Lempäälä (FI); Lauri Aarne Johannes Wirola, Tampere (FI); Petri Rauhala, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/904,939

(22) Filed: Jun. 18, 2020

(65) Prior Publication Data

US 2020/0400774 A1 Dec. 24, 2020

(30) Foreign Application Priority Data

Jun. 19, 2019 (EP) .................................... 19181204

(51) Int. Cl.
*G01S 5/02* (2010.01)
*H04W 4/33* (2018.01)
*H04W 4/02* (2018.01)
*H04W 84/12* (2009.01)
*H04W 88/08* (2009.01)

(52) U.S. Cl.
CPC ......... *G01S 5/02525* (2020.05); *H04W 4/025* (2013.01); *H04W 4/33* (2018.02); *G01S 5/02526* (2020.05); *H04W 84/12* (2013.01); *H04W 88/08* (2013.01)

(58) Field of Classification Search
None
See application file for complete search history.

(56) References Cited

U.S. PATENT DOCUMENTS 8,838,376 B2   9/2014 Garin et al.
9,037,160 B2   5/2015 Jones et al.
(Continued)

FOREIGN PATENT DOCUMENTS

CN         108449712 A      8/2018
WO    WO 2011/091306 A1    7/2011

OTHER PUBLICATIONS

Seneviratne, S. et al., *SSIDs in the Wild: Extracting Semantic Information From Wifi SSIDs*, 40th IEEE Conference on Local Computer Networks (LCN) (Oct. 2015).
(Continued)

*Primary Examiner* — Ernest G Tacsik
(74) *Attorney, Agent, or Firm* — Alston & Bird LLP

(57) ABSTRACT

A method includes obtaining one or more pieces of metadata information indicative of one or more identifiers of one or more spatial locations located within a venue, and further indicative of one or more floor level identifiers of the one or more spatial locations. The method also generates a map of one or more locations of one or more radio nodes, including altitude information, and their respective one or more pieces of identifying information. The method further includes determining one or more pieces of matching information indicative of whether a respective identifying information of the one or more radio nodes at least partially matches with at least one metadata information and, if so, associating the respective radio node with a respective altitude floor level of the respective piece of metadata information in a radio map of the venue. A corresponding apparatus and computer program product are also provided.

17 Claims, 5 Drawing Sheets

(56) References Cited

U.S. PATENT DOCUMENTS

| | | | |
|---|---|---|---|
| 9,361,633 | B1 | 6/2016 | Thiagarajan et al. |
| 9,936,348 | B2 | 4/2018 | Alizadeh-Shabdiz et al. |
| 10,028,245 | B2 | 7/2018 | Wither |
| 2009/0043504 | A1* | 2/2009 | Bandyopadhyay ..... G01S 19/48 |
| | | | 701/469 |
| 2015/0019625 | A1 | 1/2015 | Pensack-Reinhart et al. |
| 2015/0045054 | A1* | 2/2015 | Emadzadeh .......... G01S 5/0242 |
| | | | 455/456.1 |
| 2016/0161592 | A1 | 6/2016 | Wirola et al. |
| 2016/0282126 | A1* | 9/2016 | Watts ................... H04W 4/029 |
| 2017/0272911 | A1* | 9/2017 | Agrawal ............. H04L 61/6022 |
| 2018/0180707 | A1 | 6/2018 | Khan et al. |
| 2020/0382919 | A1* | 12/2020 | Huang .................. H04W 64/00 |

OTHER PUBLICATIONS

Extended European Search Report for Application No. 19181204.9 dated Jan. 31, 2020, 5 pages.

Service set (802.11 network) [online] [retrieved Jul. 15, 2020]. Retrieved via the Internet: web.archive.org/web/20190501233852/ https://en.wikipedia.org/Service_set (802.11 network) (dated May 1, 2019) 4 pages.

U.S. Appl. No. 16/782,134, filed Feb. 5, 2020, In re: Ivanov et al., entitled *Determining of Absolute Altitudes of Floors of a Structure*.

\* cited by examiner

FLOOR LEVELS OF A VENUE

CROSS-REFERENCE TO RELATED APPLICATIONS

This application claims priority to European Application No. 19181204.9, filed Jun. 19, 2019, the entire contents of which are incorporated herein by reference.

FIELD OF THE INVENTION

The following disclosure relates to the field of indoor positioning, or more particularly relates to systems, apparatuses, and methods for determining a floor level of a venue.

BACKGROUND

Indoor positioning requires novel systems and solutions that are specifically developed for this purpose. The traditional positioning technologies, which are mainly used outdoors, i.e. satellite and cellular positioning technologies, cannot deliver such performance indoors that would enable seamless and equal navigation experience in both environments. The required positioning accuracy (2-3 m), coverage (~100%) and floor detection are challenging to achieve with satisfactory performance levels with the systems and signals simply do not penetrate through the walls and roofs for adequate signal reception and the cellular signals have too narrow bandwidth for accurate ranging by default.

Several indoor-dedicated solutions have been developed and commercially deployed during the past years e.g. solutions based on pseudolites (GPS (Global Positioning System)-like short range beacons), ultra-sound positioning, BTLE respectively BLE (Bluetooth Low Energy) signals (e.g. High Accuracy Indoor Positioning (HAIP)), and WiFi fingerprinting. What is typical to these solutions is that they require either deployment of totally new infrastructure (beacons, tags and so on) or manual exhaustive radio surveying of buildings including all the floors, spaces and rooms. This is rather expensive and will take a considerable amount of time to build the coverage to the commercial expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

For an indoor positioning solution to be commercially successful, that is 1) being globally scalable, 2) having low maintenance and deployment costs, and 3) offering acceptable end-user experience, the solution needs to be based on an existing infrastructure in the buildings and on existing capabilities in the consumer devices. This leads to an evident conclusion that the indoor positioning needs to be based on WiFi- and/or Bluetooth (BT)-technologies that are already supported in almost every smartphone, tablet, laptop and even in the majority of the feature phones. It is, is, thus, required to find a solution that uses the WiFi- and BT-radio signals in such a way that makes it possible to achieve 2-3 m horizontal positioning accuracy, close to 100% floor detection with the ability to quickly build the global coverage for this approach.

A novel approach for radio-based indoor positioning that models e.g. the WiFi-radio environment (or any similar radio e.g. Bluetooth) from observed received signal strength (RSS–) measurements as two-dimensional radio maps is hereby able to capture the dynamics of the indoor radio propagation environment in a compressable and highly accurate way. This makes it possible to achieve unprecedented horizontal positioning accuracy with the WiFi-signals only within the coverage of the created radio maps and also gives highly reliable floor detection.

Huge volumes of indoor WiFi-measurements data could be harvested via crowd-sourcing if the consumer devices were equipped with the necessary functionality to enable the WiFi-data collection, e.g. as a background process, naturally with the end-user consent. It could also be possible to use volunteers to survey the sites (e.g. buildings) in exchange of reward or recognition and get the coverage climbing up globally in the places and venues important for the key customers. However, the technical challenges related to the harvesting, processing, redundancy, ambiguity and storing of the crowd-sourced data need to be understood and solved first, before the WiFi radio map creation can be based on the fully crowd-sourced data.

In IEEE 802.11 wireless communication standard, so-called Service Set Identifiers (SSID) are used to identify logical networks. Such a logical network is a collection of Basic Service Sets (BSS). Such a BSS may for instance be represented by a single (e.g. WiFi) access point. Such a BSS may for instance be identified with a Basic Service Set Identification (BSSID; e.g. a unique 48-bit identifier that follows Medium Access Control (MAC) address conventions).

For instance, a logical network may for instance be represented by e.g. all the access points (BSSs) belonging to a single company. Such a logical network may for instance be identified by a SSID, which can be set freely and is typically human-readable.

Further, Wi-Fi access points often advertise their respective SSID, e.g. in the form of message, which messages can be captured, e.g. by mobile devices.

However, when crowd-sourcing Wi-Fi radio data for indoor positioning purposes is performed and/or controlled, such automated methods can learn building radio data layers. However, a part missing is that the connection between the abstract indexing of these layers with the floor level (e.g. floor level identifiers) of the building is not given or present. This connection is meaningful to humans in order to identify e.g. a floor level of a target location in the building.

SUMMARY OF SOME EXEMPLARY EMBODIMENTS

Because indoor maps of venues (e.g. buildings) use human-readable floor level identifiers, the lack of an association between one or more radio data layers and one or more floor level identifiers means e.g. that it is impossible to show an indoor map of the correct floor to a user, e.g. when using or utilizing indoor positioning.

It is, thus, a drawback of known solutions that indoor positioning uses abstract layer indexing, which is decoupled from the real-world floor naming/indexing, e.g. as represented by one or more floor level identifiers. An association of a correct floor of a venue and an indoor radio map is done manually as part of the manual data collection process. This is in particular very cumbersome.

It is thus, inter alia, an object of the invention to provide a solution which reduces, minimizes or avoids the above-mentioned drawbacks, and in particular enables an association between a floor level or floor level identifier of a venue, such as a building, and an indoor radio map in an at least partially automated fashion.

According to a first exemplary aspect of the present invention, a method is disclosed, the method comprising:
- obtaining one or more pieces of metadata information indicative of one or more identifiers of one or more spatial locations located within a venue, and further indicative of one or more floor level identifiers of the one or more spatial locations;
- generating a map of one or more locations of one or more radio nodes and their respective one or more pieces of identifying information, wherein a respective location of the one or more radio nodes is further associated with or comprises an altitude information;
- determining one or more pieces of matching information, wherein each matching information of the one or more pieces of matching information is indicative of whether or not a respective identifying information of the one or more radio nodes at least partially matches with at least one metadata information of the one or more pieces of metadata information; and
- in case a respective matching information of the one or more pieces of matching information represents a positive result:
- associating the respective radio node with a respective floor level of the respective piece metadata information in a radio map of the venue.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by mobile device, e.g. a mobile terminal. For instance, the method may be performed and/or controlled by using at least one processor of the mobile device.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:
an apparatus according to any aspect of the invention as disclosed above, and one or more mobile devices, wherein the one or more mobile devices are configured or enabled to determine to trigger determining of a location estimate at least partially based on an associating the respective radio node with a respective altitude information or floor level of the metadata information.

In the following, exemplary features and exemplary embodiments of all aspects of the present invention will be described in further detail.

The map that is generated may for instance be referenced to as a 2.5D (2.5-dimensional) radio map. Such a 2.5D radio map, as used herein, may for instance be understood as a two-dimensional (2D) radio map comprising or representing additional discrete or quantized altitude information of one or more radio nodes respectively their location comprised by the radio map, such as e.g. floor (level, and/or level identifiers) and/or altitude values (e.g. relative altitude information). The floor level, floor level identifier and/or altitude information may for instance be—when such a 2.5D (radio) map is generated (e.g. created)—not yet associated with an exact floor/altitude value, but rather it is derivable that differences in height, thus floor/altitude values of one or more certain radio nodes locations comprised by the 2.5 D (radio) map are present.

Indoor positioning and/or floor detection may for instance be performed and/or controlled based on a (indoor) radio map of the venue in that e.g. associations as a result of performing and/or controlling the method according to the first exemplary aspect may for instance be stored.

Such a radio map may be understood to represent an area of a pre-determined environment within which the one or more radio nodes are expected to support e.g. mobile devices to get their positions estimated. Additionally or alternatively, the radio map may be defined by an environment and/or an area (e.g. a venue, or a part of it) within which the one or more radio nodes are capable to support e.g. mobile devices to estimate their positions.

The (e.g. expected) radio coverage associated with the one or more radio nodes may describe (e.g. define) the area within which a radio signal transmitted or triggered to be transmitted by the one or more radio nodes are (e.g. expected to be) observable (e.g. receivable with a minimum quality).

For instance, the radio map may contain or represent a respective radio coverage model for each radio node of the one or more radio nodes. Therein, a radio coverage model for a respective radio node may for instance be understood to represent the expected radio coverage associated with this radio node.

Based on the radio map, it may for instance be determined, whether certain identifying information of the one or more radio nodes are expected to be observable. For instance, the radio map may comprise information indicative of any position within the coverage area covered by the radio map at which (e.g. different) signals or a number of different signals are expected to be observable. Such information may for instance be gathered, and then a corresponding radio map comprising the gathered information may be generated.

The radio map may for instance be provided for use by one or more mobile devices to estimate their positions at least partially based on this radio map. A radio map may represent an estimate of a two-dimensional or a three-dimensional coverage map. It may describe (e.g. define) the expected radio coverage of a respective radio node of the one or more radio nodes within which one or more signals transmitted or triggered to be transmitted by the respective radio node (e.g. installed at an installation position) is expected to be observable. The real radio coverage of the radio node may however deviate from such an expected radio coverage.

A radio coverage model may be a hard-boundary or a soft-boundary model (e.g. a hard-boundary model or a soft-boundary model describing an expected radio coverage).

An example for a soft-boundary radio coverage model may be a parametric radio model. Data of such a parametric radio model may be considered to be data which enable determination of one or more characteristics of one or more signals transmitted or triggered to be transmitted by a respective radio node of the one or more radio nodes that are expected to be observable at different positions. For example, data of such a parametric radio model may represent radio transmission parameters of the parametric radio model. Using radio transmission parameters of the parametric radio model may have the effect that the required amount of data for defining the one or more characteristics of one or more signals may be particularly small. An example of a parametric radio model is a path loss model for (radio) signals transmitted or triggered to be transmitted by a respective radio node of the one or more radio nodes. In this case, the radio transmission parameters may comprise a path loss exponent and an indication of a transmission power used by the transmitter of the respective radio node of the one or more radio nodes. Based on data of a parametric radio model an expected radio coverage of a respective radio node of the one or more radio nodes installed at a (potential) installation position may be determined.

Radio transmission parameters of a parametric radio model of a respective radio node of the one or more radio nodes may be at least partially determined (e.g. derived or selected or calculated) at least partially based on one or more observation reports. For example, the radio transmission parameters of a parametric radio model of a radio positioning support device may at least partially correspond to and/or determined based on one or more radio transmission parameters associated with this radio node of the one or more radio nodes, wherein the one or more radio transmission parameters associated with this radio node of the one or more radio nodes may for example be represented by and/or contained in the one or more observation reports (e.g. one or more observation reports associated with the radio node and/or an (e.g. adjacent) radio node of the one or more radio nodes).

In case different values are determined for a radio transmission parameter based on one or more radio transmission parameters represented by and/or contained in the one or more observation reports, a mean value (e.g. an arithmetic mean value or a median mean value) may for example be used as a value for this radio transmission parameter. Alternatively, one value of the different values may be selected according to a pre-determined rule to be used for as a value for this radio transmission parameter (e.g. the lowest or highest value may be used as value for this radio transmission parameter).

An indication of a transmission power of a radio node of the one or more radio nodes and an indication of one or more (received) signal strength values for a (radio) signal of one or more signals may be referred to as radio transmission parameters. A radio transmission parameter may be understood to be associated with a radio node of the one or more radio nodes if the radio transmission parameter describes a feature (e.g. a physical quantity) of a radio signal transmitted or triggered to be transmitted by this radio node, for example if the radio transmission parameter indicates a transmission power of this radio node and/or if the radio transmission parameter indicates a (received) signal strength value for a signal transmitted or triggered to be transmitted by this radio node of the one or more radio nodes.

If the installation positions of the one or more radio nodes and, thus, also the distances between the one or more radio nodes are known, such radio transmission parameters associated with a radio node of the one or more radio nodes may for example be used to determine (e.g. calculate) further radio transmission parameters for a parametric radio model like e.g. a path loss exponent.

An example for a hard-boundary radio coverage model may be a geometric model. Data of such a geometric radio model may be considered to be data which (e.g. geometrically) describe (e.g. define) an expected radio coverage of a radio node of the one or more radio nodes (e.g. installed at an installation position).

For instance, a terrestrial transmitter (e.g. comprised by or represented by a radio node of the one or more radio nodes) based positioning at a particular site (e.g. in the venue) may be based on radio maps, which allow determining for instance which received signal strength values of which transmitters can be expected at various locations of the particular site.

For making use of a positioning service, an apparatus (e.g. a mobile device) may detect signals sent by a plurality of radio nodes and measure their respective signal strengths. The apparatus may transmit the results of the measurements along with identifying information of the respective radio nodes to another apparatus, e.g. a radio map and positioning server.

An identifier may be for instance in the form of a service set identifier (SSID), and the results of measurements may be for instance in the form of a received signal strength indicator (RSSI). The radio map and positioning server may evaluate the signals taking account of data stored in radio maps and returns a position (e.g. in the form of coordinates) that are consistent with the measured signal strengths of the plurality of radio nodes.

The one or more radio nodes may for instance be comprised by a venue, e.g. by an infrastructure of the venue. Such a radio node of the one or more radio nodes may for instance be a radio node, e.g. of the venue. Such a radio node may for instance be used for indoor positioning and/or floor detection, e.g. according to BT-(Bluetooth) and/or BLE-(Bluetooth Low Energy) specification, or may for instance be a Wi-Fi Access Point for indoor positioning and/or floor detection, e.g. according to the WLAN-(Wireless Local Area Network) specification).

Such a radio node (e.g. WiFi access point, beacon device, or a combination thereof, to name but a few non-limiting examples) of the one or more radio nodes, e.g. of the venue, may for instance comprise or be connectable to a transceiver, e.g. according to the BT-, BLE, and/or WLAN-specification to provide wireless-based communication. Each radio node of the one or more radio nodes, e.g. of the venue, may for instance use such a transceiver for transmitting and/or broadcasting one or more signals, e.g. comprising one or more information, such as a SSID of the respective radio node of the one or more radio nodes.

The venue may for instance be a building, shopping mall, office complex, public accessible location (e.g. station, airport, university or the like), to name but a few non-limiting examples.

One or more signals sent by a respective radio node of the one or more radio nodes may for instance be observable at a certain location within the venue. Such one or more signals may for instance be observable and/or receivable by one or more mobile devices, e.g. located within the vicinity of the respective radio node of the one or more radio nodes. Additionally or alternatively, a respective signal strength (e.g. received signal strength value, e.g. RSSi) may for instance be gathered (e.g. measured) at a certain location within the venue.

An identifying information of a respective radio node of the one or more radio nodes may for instance enable to (uniquely) identify one specific radio node of the one or more radio node. The one or more pieces of identifying information may for instance be determined, e.g. by receiving the respective identifying information from the respective radio node. Additionally or alternatively, the one or more pieces of identifying information may for instance be determined, e.g. by extracting the one or more pieces of identifying information out of respective received one or more signals (that were sent by the one or more radio nodes).

The one or more spatial locations may for instance represent shops, restaurants, public accessible infrastructure (e.g. restrooms, information bureau, or the like), to name but a few non-limiting examples. The one or more spatial locations may for instance be characterized by their unique location and/or attributes associated with the one or more spatial locations. The one or more spatial locations may for instance be located within the venue, or at least in the vicinity of the venue. In this way, it is ensured that the one or more spatial locations are at least somehow in connection with the venue. The one or more spatial locations may for instance be identifiable by a respective identifier of the one or more identifiers. Such an identifier of the one or more identifiers may for instance be a name of the respective spatial location. Such an identifier of a respective spatial location of the one or more spatial locations may for instance be human-readable. Such an identifier of a respective spatial location of the one or more spatial locations may for instance be comprised by a map (human-readable) of the venue. In this way, the one or more identifiers of the one or more spatial locations may for instance be obtained from such a map. The one or more identifiers may for instance be comprised or represent by at least a part of the one or more pieces of metadata information. One or more attributes of the one or more spatial locations may for instance be a respective floor level or floor level identifier of the venue, wherein the respective floor level or floor level identifier is indicative of a floor of the venue at which the respective spatial location of the one or more spatial locations is located (on).

The map of one or more locations of one or more radio nodes may for instance be generated, e.g. by creating the map. The map may for instance comprise or represent (e.g. after its generation) one or more pieces of identifying information (e.g. SSIDs) of one or more radio nodes that are located within the venue, and/or within the vicinity of the venue.

Further, a respective location of the one or more radio nodes (that are located within the venue, and/or within the vicinity of the venue) are associated with or comprises an altitude information (e.g. relative or absolute altitude value and/or floor level, may not be exact and/or dedicated values, but limited to relations between the respective one or more radio node locations, thus, discrete values) of a respective radio node of the one or more radio nodes. For instance, such an altitude information of a respective radio node location comprised by the map may for instance represent that a received signal strength of a respective radio node is higher at an altitude respectively floor than a receivable signal strength from another radio node observable at the same location within the venue. Thus, based on one or more (e.g. a plurality) of such measurements (e.g. obtainable by crowd-sourcing of one or more pieces of (radio) fingerprints (e.g. radio observation reports), to name but one non-limiting example), a relation between the one or more radio nodes of the venue in particular with an altitude respectively floor level at which a respective radio node of the one or more radio nodes is located within the venue may for instance be determinable respectively determined (e.g. calculated). Such a relation between one or more radio node locations in the venue may for instance be discrete, thus not be indicative of absolute values respectively information of altitude (e.g. absolute altitude value) and/or floor (e.g. certain floor level (e.g. identifier)).

The one or more pieces of matching information are determined (e.g. calculated), e.g. based on a comparison between each respective identifying information of the one or more pieces of identifying information, or at least a part of it/them, and each respective metadata information of the one or more pieces of metadata information, or at least a part of it/them.

In case a respective match between a respective identifying information and a respective metadata information is found, a respective result may for instance be stored, e.g. so that the respective matching information comprises or represents the respective result. The result may for instance be indicative of a positive match, or of a negative match, to name but a few non-limiting examples. The result may for instance be represented by a binary value, may for instance be associated with a certain uncertainty value (e.g. in case that only a part of a respective identifying information matches with a respective metadata information), to name but a few non-limiting examples.

In case a respective piece of matching information represents a positive result, the respective radio node (that is comprised or represented by the respective identifying information) is associated with a respective altitude information or floor level (e.g. floor level identifier) of (e.g. comprised or represented by) the respective metadata information of the one or more pieces of metadata information in a radio map of the venue. Then, the association may for instance be stored, e.g. in a respective radio map of the venue. Further, the respective radio map of the venue may for instance be stored in a memory (e.g. a database), e.g. that is comprised by or connectable to the apparatus that performs and/or controls the method according to the first exemplary aspect of the present invention.

Additionally or alternatively, such an association may for instance be stored in an indoor radio map, and/or the map of one or more radio node locations, and/or the indoor map of the venue, to name but a few non-limiting examples. The stored association may for instance be utilized respectively used, e.g. when determining a location estimate of a mobile device, e.g. that is located within the venue and may for instance request its respective position to be determined (e.g. by requesting a location estimate to be determined), and/or determine its respective position at least partially based on the determined association.

In case the method according to the first exemplary aspect is performed and/or controlled by a mobile device, such a mobile device may for instance comprise or be connectable to a transmitter, e.g. according to wireless local area networks (WLAN), to Bluetooth (BT) or to Bluetooth Low Energy (BLE) communication standard. Such a mobile device may for instance be configured to observe or receive (e.g. standard) signals e.g. that are sent (e.g. broadcast) by a respective radio node of the one or more radio nodes in order to advertise their respective presence. In some cases, the one or more radio nodes may advertise in this way availability to one or more mobile devices seeking a connection, e.g. via corresponding signals. The signals may convey information in the form of packets of pre-defined format, and the information respectively signals may include or comprise or represent at least an identifier (e.g. SSID) of the respective radio node. A respective radio node of the one or more radio nodes may be visible to any mobile device with suitable radio interface, regardless of whether or not they are known to the mobile device. Such a mobile device may for instance be a smartphone, tablet, wearable, portable navigation device, or the like, to name but a few further non-limiting examples.

One or more signal strength values observable at a certain location within or in the vicinity of the venue may for instance be determined, e.g. by measuring the one or more signal strength values based on sent signals of the one or more radio nodes. One of the one or more signal strength values may for instance be represented by a received signal strength value (RSS). Such a received signal strength value may for instance represent the power of a received radio positioning support signal, wherein such a radio positioning support signal may for instance be sent (e.g. periodically) from each radio node of the one or more radio nodes. An example of a received signal strength parameter is a received signal strength indicator (RSSI) or a representation of a physical receiving power level value (e.g. a Rx power level value) in dBm. A signal strength value may for instance represent a signal strength measurement of the observable signal strength at the location (e.g. within the venue) of the measurement.

According to an exemplary embodiment of all exemplary aspects of the present invention, the method further comprises:
  clustering the one or more radio nodes in one or more groups, wherein each group of the one or more groups is indicative of a specific radio data layer of the venue, wherein the one or more radio nodes are clustered in the one or more groups based on an observable signal strength of the respective radio node; and wherein the matching information is determined further at least partially based on the one or more groups.

A respective group of the one or more groups may for instance comprise, consist, or be represented by one or more radio nodes that are located in one specific venue (e.g. building) radio data layer. Thus, a respective group of the one or more groups may for instance comprise certain radio nodes that are located e.g. on the same floor and/or altitude value (e.g. absolute altitude value, e.g. height above sea level). Thus, one or more radio nodes of one specific group may for instance be located on the same floor, but it may not be known at which specific floor of the venue. Further, based on the one or more groups, it may for instance be determinable which one or more radio nodes of a certain group are located above or below (altitude wise) one or more further radio nodes of a different group. The specific floor or floor level identifier may for instance be comprised or represented by a corresponding metadata information of the one or more pieces of metadata information. The specific floor or floor level identifier may for instance be human-readable.

The associating of the indoor map with the one or more groups may for instance be performed and/or controlled so that the result(s) is (are) indicative of which radio node(s) of a group of the one or more groups belongs (belong) to a respective floor level of the venue. This may for instance be performed and/or controlled by determining the matching information at least partially based on the one or more groups. Thus, the one or more pieces of metadata information, e.g. as obtained (e.g. retrieved and/or derived) from the indoor map of the venue that is human-readable, may for instance be associated with one or more radio nodes of the venue, e.g. at least partially based on respective identifying information (e.g. SSIDs) of the one or more radio nodes, so that a specific floor level at which the one or more radio nodes are located within the venue may for instance be determined (e.g. derived as a result).

The clustering of the one or more radio nodes into the one or more groups (e.g. being indicative of one or more radio nodes respectively their identifying information that belong to one specific venue (e.g. building) radio data layer) may for instance give information of one or more layers of radio nodes in the venue.

The clustering of the one or more radio nodes of the venue to one or more groups, wherein each group may for instance comprise (e.g. consist) of one or more radio nodes (e.g. access points) in a (e.g. one specific) venue (e.g. building) radio data layer may for instance be performed and/or controlled based, at least partially, on one or more signal strengths when a respective radio node (e.g. an access point) is detected at high signal strength in some layer. In this case, the (same) radio node (e.g. access point) may for instance be associated with that layer.

Additionally or alternatively, the clustering of the one or more radio nodes of the venue to one or more groups may for instance be performed and/or controlled based, at least partially, on one or more pieces of altitude information. Such altitude information to be utilized for the clustering may for instance be gathered by one or more barometric sensors (e.g. gathering (e.g. measuring) altitude information indicative of a (e.g. relative or absolute) altitude value, e.g. in relation to a recent altitude change, or in relation to sea level, to name but a few non-limiting examples), wherein the one or more barometric sensors may for instance be comprised or be connectable to a respective mobile device. For instance, such altitude information gathered by one or more barometric sensors may for instance be associated with one or more radio nodes which respective signals are observable at a certain location, e.g. when a respective mobile device gathers a respective fingerprint information. Then, the respective radio nodes (e.g. represented or comprised by the gathered fingerprint which may for instance form the basis for generating respectively creating of a radio map) may for instance be associated respectively linked to the e.g. altitude value as represented by the gathered altitude information. Thus, the altitude information gathered by a respective barometric sensor may for instance be gathered simultaneously to a respective fingerprint information. Further, the respective fingerprint information and the respective altitude information may for instance be gathered by the same mobile device, to name but one non-limiting example.

According to an exemplary embodiment of all exemplary aspects of the present invention, the clustering is performed and/or controlled at least partially based on a pre-determined or determined to pre-defined rules signal strength threshold value.

The clustering of the one or more radio nodes into the one or more groups may for instance be at least partially based on (e.g. received) signal strength (e.g. values) of the one or more radio nodes that is observable at one or more certain location within the venue, or within the vicinity of the venue. For instance, (a) high signal strength value radio node(s) may for instance be clustered into a specific group of the one or more groups. Further, (a) low signal strength value radio node(s) may for instance not be clustered to be comprised by this specific group comprising a respective high signal strength radio node, but in a different group of the one or more groups. The clustering may for instance further be performed and/or controlled based on a threshold value. Such a threshold value may for instance be used to determine whether a respective radio node of the one or more radio nodes belongs to the high signal strength or low signal strength ones, to name but one non-limiting example.

According to an exemplary embodiment of all exemplary aspects of the present invention, the one or more pieces of metadata information are obtained (e.g. retrieved/extracted) from an indoor map of the venue, wherein at least a part of the indoor map of the venue comprises or represents one or more identifiers (e.g. names) of one or more spatial locations (e.g. shops and restaurants, characterized by its unique location and/or attributes) located within a venue, and at least one further part of the indoor map comprises or represents one or more pieces of altitude information (e.g. floor level) associated with at least one of the one or more spatial locations.

The one or more pieces of metadata information may for instance be obtained, e.g. by receiving the one or more pieces of metadata information from an entity that is different from the apparatus performing and/or controlling the method according to the first exemplary aspect of the present invention. Additionally or alternatively, the one or more pieces of metadata information may for instance be obtained, e.g. by retrieving (e.g. extracting) the one or more pieces of metadata information out of a map (e.g. a human-readable map) of the venue. In case such one or more pieces of metadata information have been retrieved from such a map, the one or more pieces of metadata information may for instance be stored, e.g. in a memory (e.g. a database), e.g. that is comprised by or connectable to the apparatus performing and/or controlling the method according to the first exemplary aspect of the present invention. Then, the one or more pieces of metadata information may for instance be obtained, e.g. by retrieving the one or more pieces of metadata information from the memory. Additionally or alternatively, the one or more pieces of metadata information may for instance be obtained, e.g. by retrieving (e.g. extracting) the one or more pieces of metadata information from one or more third parties, such as e.g. available via the Internet, to name but one non-limiting example.

Additionally or alternatively, the one or more pieces of metadata information may for instance be obtained at least partially based on one or more maps from a specific venue (e.g. the venue), and/or based on collected pieces of information from other sources (e.g. based on web crawlers, to name but a few non-limiting examples).

According to an exemplary embodiment of all exemplary aspects of the present invention, the one or more radio nodes are (e.g. WiFi) access points located within the venue (or within the vicinity of the venue).

The one or more groups may for instance comprise and/or consist of (e.g. WiFi) access points in one specific building radio data layer, as disclosed above.

The vicinity of the venue (e.g. building) may for instance be a diameter of e.g. 100 m to 200 m (to name but one non-limiting example), so that e.g. one or more squares, places, parking lots, or the like, as often comprised by or associated with the venue, e.g. shopping malls, airports, public accessible buildings (to name but a few non-limiting examples) may for instance be comprised by a (indoor) radio map of the venue as well. It will be understood that such one or more squares or the like are technically not considered to be indoors, but within the meaning of the present invention do belong to the venue (e.g. building) as well.

According to an exemplary embodiment of all exemplary aspects of the present invention, the method further comprises:
determining a floor level at least partially based on the radio map of the venue, wherein the floor level is indicative of a floor of the venue a mobile device is located on.

The floor level (or floor level identifier) of the venue is human-readable. In order to determine the floor level, e.g. the respective identifying information (e.g. SSIDs) of the one or more radio nodes of the one or more groups (in which the one or more radio nodes are optionally clustered), may for instance be compared to the one or more pieces of metadata information (e.g. obtained from a map (human-readable) of the venue). In this way, it is achieved to determine one or more pieces of information on how the one or more groups are related to the real-world human-readable floors (or floor level identifiers) of the venue. When a result of such a comparison is strong enough, e.g. based on enough statistical evidence, to name but one non-limiting example, the association between the respective group of the one or more groups (or all groups of the one or more groups) belonging to the respective venue (e.g. building) radio data layer (or all venue radio data layers) can be performed and/or controlled. Thus, the determining may for instance comprises checking for statistical evidence that one or more identifying information (e.g. SSID) of one or more radio nodes matches (e.g. at least partially, e.g. not all characters comprised by strings representing the respective identifying information and/or metadata information) the one or more pieces of metadata information.

According to an exemplary embodiment of all exemplary aspects of the present invention, a respective piece of metadata information of the one or more pieces of metadata information comprises or represents a MAC (Medium Access Control) address, signal strength value, SSID, or a combination thereof of at least a part of the one or more radio nodes.

The MAC address, signal strength value, SSID, or a combination thereof of at least a part of the one or more radio nodes may for instance be obtained as a part of the obtaining of the one or more pieces of metadata information.

According to an exemplary embodiment of all exemplary aspects of the present invention, the determining of the matching information further comprises a string comparison of the one or more pieces of metadata information and the one or more pieces of identifying information (e.g. SSIDs of (e.g. WiFi) access points) of the one or more radio nodes.

As disclosed above, the determining may for instance comprises checking for statistical evidence that one or more pieces of identifying information (e.g. SSID) of one or more radio nodes match (e.g. at least partially, e.g. not all characters comprised by strings representing the respective identifying information and/or metadata information) with the one or more pieces of metadata information. In case only a part of the e.g. strings representing the respective identifying information and/or metadata information match with each other, for instance, an uncertainty value may for instance be associated with the result of the comparison. The uncertainty value may for instance be determined according to the percentage of the respective identifying information matching a respective metadata information.

According to an exemplary embodiment of all exemplary aspects of the present invention, a respective piece of identifying information of the one or more pieces of identifying information comprises or represents a SSID, MAC addresses, a BSS, or a combination thereof of the one or more radio nodes. (e.g. of WiFi) access points).

According to an exemplary embodiment of all exemplary aspects of the present invention, the method further comprises:
  receiving or obtaining a request for determining a location estimate, wherein the request comprises or is accompanied by a fingerprint information (e.g. in particular comprising SSIDs of radio nodes); and
  determining the location estimate at least partially based on the fingerprint information and the radio map of the venue.

The request may for instance be triggered as a service provided by the apparatus performing and/or controlling the method according to the first exemplary aspect of the present invention, such as a positioning service (e.g. location-based service (LBS)). Such a positioning service may for instance also be provided e.g. by an entity that is different from the apparatus performing and/or controlling the method according to the first exemplary aspect of the present invention, e.g. a radio map and positioning server that utilizes the result (e.g. the stored (indoor) radio map of the venue) or the method according to the first exemplary aspect of the present invention.

The request may for instance be a positioning request. The request may for instance be obtained by receiving the request from an entity, e.g. a server or a mobile device. Further, the request may for instance be obtained by receiving the request via user input. After such a request is obtained, the request may for instance trigger a location estimate to be determined.

The request may for instance comprise or be accompanied by a fingerprint information, e.g. that was gathered (e.g. measured) by the respective device (e.g. mobile device) that has sent the request to the apparatus performing and/or controlling the method according to the first exemplary aspect of the present invention. Such a fingerprint information may for instance be indicative of one or more pieces of identifying information of one or more radio nodes that are observable at a certain location at which the respective fingerprint information was gathered (e.g. measured). Additionally, such a fingerprint information may for instance be indicative of one or more signal strength values of one or more signals sent by the one or more radio nodes, and with which the one or more signals are observable at the certain location (e.g. within the venue, or within the vicinity of the venue). For instance, such a fingerprint information may for instance include for each radio node of the one or more radio nodes which one or more signals are observable at the location at which the fingerprint information was gathered. Further, such a fingerprint information may for instance be indicative of which signals conveying information of the one or more radio nodes were detected, out of which signals e.g. the identifying information (e.g. SSID of the respective radio node) may for instance be extracted. Further, such a fingerprint information may for instance be indicative of one or more received signal strength values (e.g. in dBm) of the respective one or more signals of the one or more radio nodes that are observable at the location at which the respective fingerprint information was gathered (e.g. measured).

Further, the request for determining a location estimate may for instance comprise one or more SSIDs respectively one or more pieces of SSID information of one or more radio nodes. The request may for instance comprise only the one or more SSIDs respectively one or more pieces of SSID information, e.g. as a part of the fingerprint information. In this case, the fingerprint information may for instance not comprise any other pieces of information, only the one or more SSIDs respectively one or more pieces of SSID information. This may for instance enable that the determined location estimate may for instance just comprise or represent e.g. a floor level. The location estimate can be determined to just represent such a floor level e.g. in case e.g. a previously determined meta data association according to all exemplary aspect of the present invention is available respectively present.

Such a request may for instance be provided (e.g. sent) to a server, e.g. a radio map and positioning server, e.g. represented by the apparatus performing and/or controlling the method according to the first exemplary aspect of the present invention. In case such a radio map and positioning server is not represented by the apparatus performing and/or controlling the method according to the first exemplary aspect of the present invention, the radio map and positioning server may for instance relay a received request to the apparatus performing and/or controlling the method according to the first exemplary aspect of the present invention so that the request is received. Upon receiving the request, the apparatus performing and/or controlling the method according to the first exemplary aspect of the present invention may for instance determine a location estimate indicative of the position of the respective device (e.g. mobile device) that has (initially) sent the request respectively from which the request stems. Then, after the determining of the location estimate, the determined location estimate may be transmitted to the device that requested its position to be determined by the request.

The determined location estimate may for instance be indicative of a floor (or floor level identifier, and/or altitude information (e.g. that is human-readable)) of the venue at which the respective device that requested its position to be determined by the request is located. In order to determine the location estimate, the determined association between the respective radio node with a respective altitude information or floor level of the metadata information in a radio map of the venue is used respectively utilized, and/or the respective (indoor) radio map of the venue that comprises or represents one or more of such associations determined by the method according to the first exemplary aspect of the present invention is utilized or used.

According to an exemplary embodiment of all exemplary aspects of the present invention, the location estimate is determined further based on a rough location estimate. (e.g. Assisted Global Positioning System (A-GPS), or cell localization, to name but a few non-limiting examples). Such a rough location estimate may for instance be comprised or accompanied by the request (e.g. in addition to the fingerprint information), or may for instance be part of or comprised by the fingerprint information comprised by or accompanying the request. Such a rough location estimate may for instance be indicative of a position at which the device that requested its position to be determined by the request is located, but the accuracy may for instance be weak, e.g. more than 10 m off the actual position.

It will be understood that the apparatus performing and/or controlling the method according to the first exemplary aspect of the present invention may for instance be represented by a mobile device. In this case, the mobile device can determine a location estimate, as disclosed above, for itself. Then, e.g. the request may for instance be obtained, e.g. by the request being triggered by user input into the mobile device (e.g. by starting a positioning application or map service, to name but a few non-limiting examples), wherein in order to determine the location estimate, e.g. the associating of the method according to the first exemplary aspect may for instance be utilized or used, as disclosed above.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
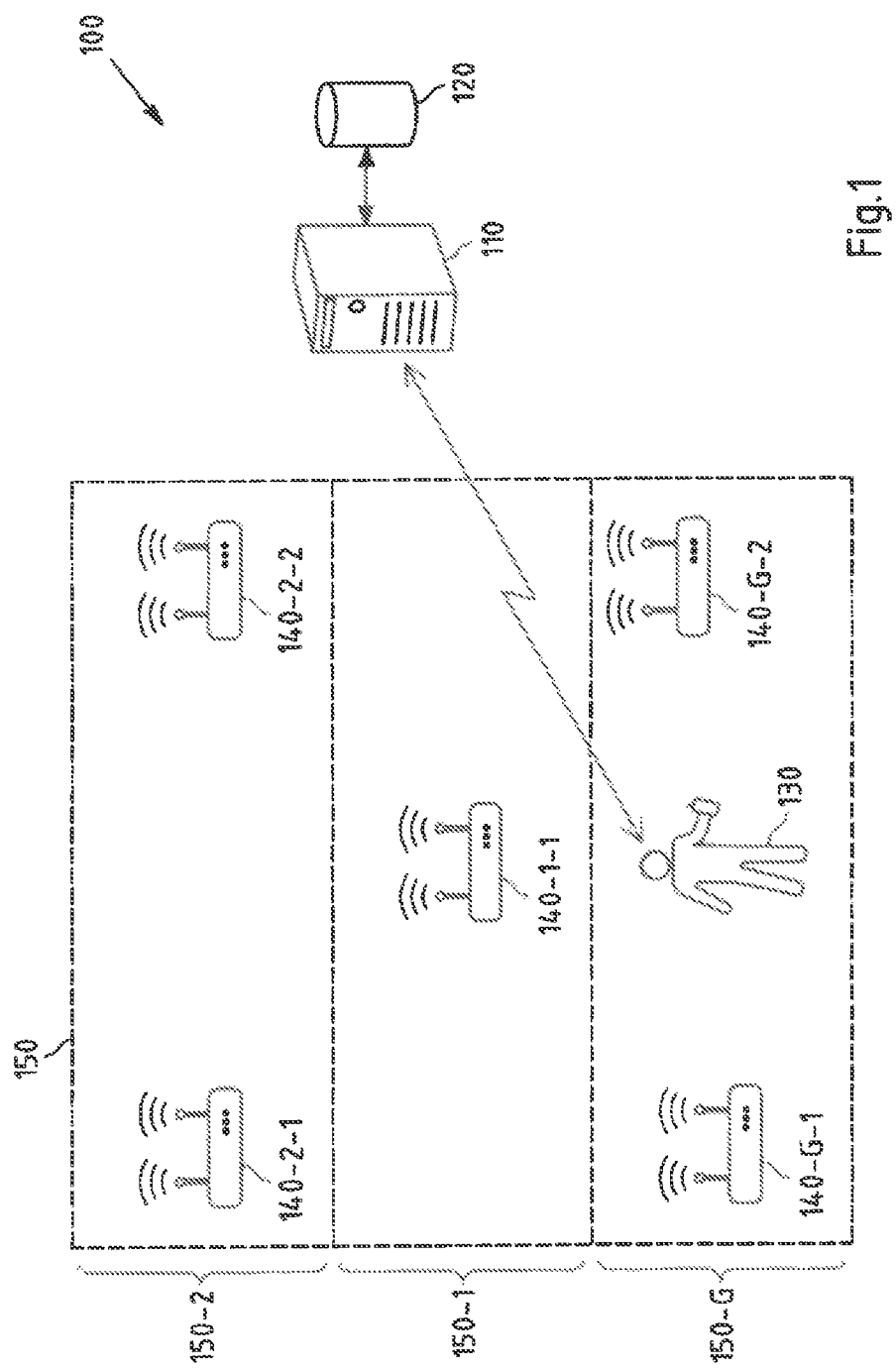
FIG. 1 a schematic block diagram of a system according to an exemplary aspect of the present invention.

FIG. 1 is a schematic high-level block diagram of a system 100 according to an exemplary aspect of the present invention. Such a system 100 may for instance represent a generic system architecture which may for instance be utilized by example embodiments of the present invention.

System 100 comprises a server 110, an optional database 120, one or more radio nodes (e.g. WiFi access points) 140, and one or more mobile devices 130, from which one example of a smartphone that is carried by a user is shown.

The one or more radio nodes 140 are located within the venue 150. Venue 150 may for instance be a building, such as an office building, shopping mall, airport, station, or the like, to name but a few non-limiting examples.

The venue 150 comprises a plurality of floors. Exemplary three different floors 150-G, 1501, and 150-2 are shown. Each of the floors 150-G, 150-1, and 150-2 comprises one or more radio nodes 140. For instance, floor or floor level 150-G comprises radio nodes 140-G-1 and 140-G-2, floor or floor level 150-1 comprises the radio node 140-1-1, and floor or floor level 150-2 comprises the radio nodes 140-2-1 and 140-2-2.

As disclosed above, the mobile device 130 may for instance be embodied as a smartphone, tablet, wearable, portable navigation device, IoT (Internet-of-Things) device, or may be comprised, be a part of, or be embedded into a vehicle, to name but a few non-limiting examples.

The server 110 may for instance be embodied as a server cloud (e.g. a plurality of servers connected, e.g. via the Internet and providing one or more services at least partially jointly). The server 110, the mobile device 130 respectively one or more mobile devices and/or the radio nodes 140 may for instance be connected, e.g. via a communication network (e.g. cellular communication network) e.g. to each other.

The optional database 120 may for instance be comprised by or connectable to the server 110. The optional database 120 may for instance comprise a memory, e.g. for storing one or more pieces of metadata information, one or more maps, one or more pieces of matching information, one or more groups, one or more associations between one or more radio nodes and one or more altitude information or floor levels, one or more pieces of altitude information, one or more floor levels, one or more radio maps, one or more location estimates, or a combination thereof, to name but a few non-limiting examples.

The server 110 may for instance be configured to perform and/or control the method according to the first exemplary aspect of the present invention.

Example embodiments according to all exemplary aspects of the present invention may for instance enable to use the Wi-Fi network names included in SSIDs (e.g. of the radio nodes 140) and match them with the metadata (e.g. metadata information) of the indoor maps, like the names of the shops in a shopping mall. Alternatively, this metadata may for instance be obtained (e.g. collected) from other sources like internet pages of related shops and restaurants (e.g. by using web crawlers).

For instance, it may be known approximately where a mobile device (e.g. mobile device 130) is (e.g. with the accuracy of city block or better), e.g. as represented by a rough location estimate. The mobile device may be actually located inside of a building (e.g. venue 150) and observes the surrounding Wi-Fi access points (e.g. radio nodes 140) and their SSIDs (e.g. as represented by one or more pieces of identifying information). The mobile device 130 may for instance notice the string "McDonalds" in one or more SSIDs, e.g. in the identifying information of radio nodes 140-G-1. Also, "McDonalds" may be found in a respective metadata information (e.g. the metadata) of a specific indoor radio map or (human-readable) map of the venue, e.g. in the indoor radio map of the ground level floor (e.g. floor 150-G) of the venue 150 (e.g. shopping mall building). Now, as a part of automated Wi-Fi crowdsourcing task, a device listens to those radio nodes (e.g. Wi-Fi access points) of the venue which have the string "McDonalds" in the identifying information (e.g. SSID) and estimates (e.g. based on the signal strength readings) when the mobile device is in the ground level floor of the venue (e.g. building). Through this mechanism the connection between the abstract radio layer indexing and real-world can be built, e.g. one floor at a time.

A map may for instance be generated (e.g. created) for the venue (e.g. a shopping mall). This map may for instance be obtained. Then, out of this map, e.g. one or more pieces of metadata information may for instance be obtained (e.g. retrieved or extracted). The map may for instance comprise (e.g. include e.g. as metadata) names of shops and restaurants in each floor of the venue (e.g. building). The map may for instance be a real venue map with one or more floor plans or the like, and/or it may for instance be a semantic map containing just the names of the shops, restaurants, etc. with their respective floor levels (e.g. identifiers).

Such mentioned Wi-Fi crowdsourcing (which gathers also identifying information (e.g. SSIDs of radio nodes (e.g. WiFi access points)) may for instance take place automatically when a user walks around the venue.

Figure 3:
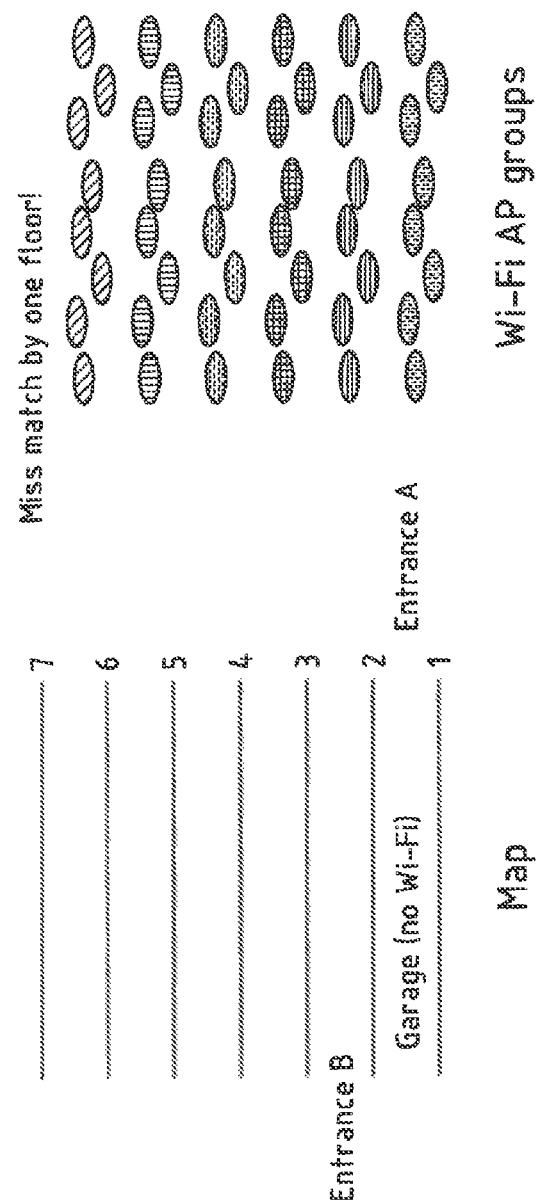
FIG. 3 a schematic illustration of a map that is part of an example embodiment of a method according to the first exemplary aspect of the present invention.

A 2.5D map of radio node (e.g. WiFi access point) locations is generated (e.g. created). This may for instance be done e.g. by clustering the one or more radio nodes of the venue to one or more groups, wherein each group may for instance comprise (e.g. consist) of radio nodes (e.g. Wi-Fi access points) in one specific venue (e.g. building) radio data layer. Such clusters are shown in FIG. 3 on the right hand side. The association to the layers may for instance be done at least partially based on signal strength when a radio node (e.g. a WiFi access point) is detected at high signal strength in some layer, the (same) radio node (e.g. WiFi access point) is associated with that layer. A threshold signal strength may for instance be determined (e.g. chosen) so that a respective mobile device and radio node (e.g. WiFi access point) can be considered to be necessarily close to each other. An exemplary value could be e.g. −50 dBm. In this way, information about the number of layers (representing floors) in a venue (e.g. the building of the disclosed example) be determinable, but one or more radio nodes (e.g. WiFi access points) may for instance not be associated with/to the actual floors (and floor level identifiers (e.g. floor numbers)) in the indoor map (see the FIG. 3).

Figure 4:
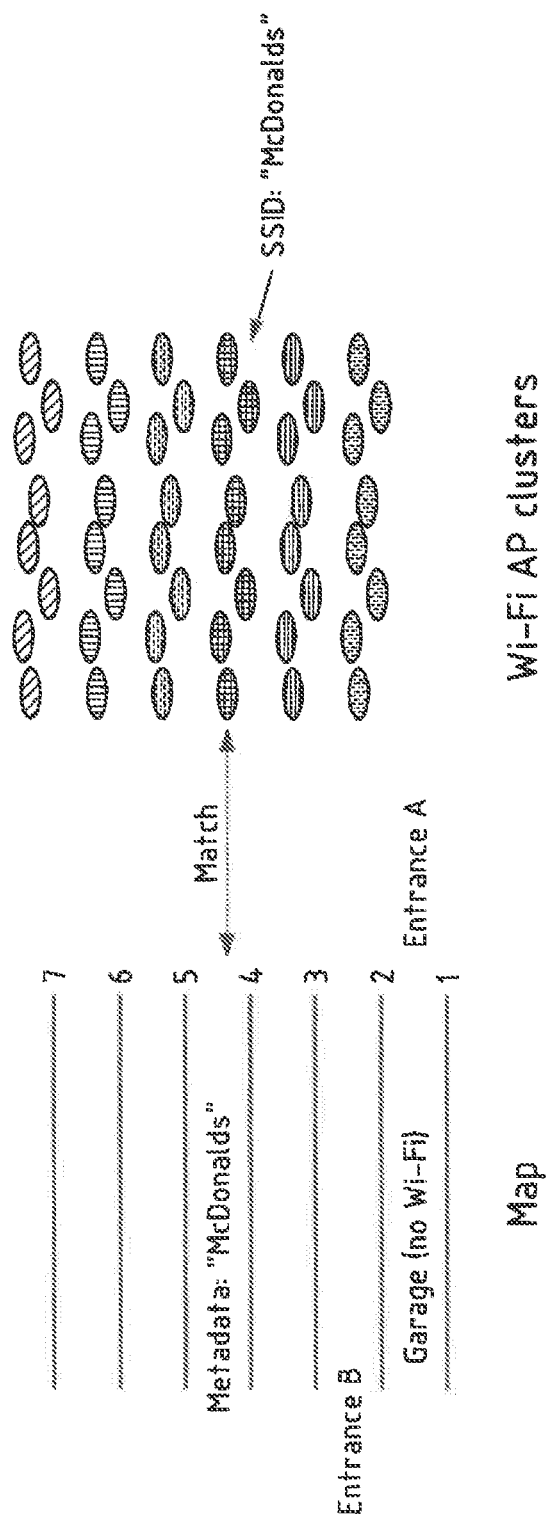
FIG. 4 a map based on the map of FIG. 3 after an association that is part of an example embodiment of a method according to the first exemplary aspect of the present invention is performed and/or controlled.

The respective pieces of identifying information (e.g. SSIDs) in the clusters (e.g. one or more groups) may for instance be compared to the metadata (e.g. represented by the one or more pieces of metadata information) of the map, e.g. to find information on how the clusters (e.g. one or more groups) relate to the real-world human-readable floors. When the result of the comparison respectively matching is strong enough (e.g. enough statistical evidence), an association between clusters (e.g. one or more radio nodes of one or more groups, or the one or more groups) belonging to the venue (e.g. building) radio data layer(s) and the real-world may for instance be done. FIG. 4 shows the result after the association is performed and/or controlled. It can be seen that the one or more groups respectively shown on the right side of FIG. 3 and FIG. 4 are now associated with a certain floor. In comparison to FIG. 3, the respective one or more groups comprising one or more radio nodes of FIG. 4 have been moved one real-world floor level upwards.

In this way, it is enabled to reliable show a position in a correct floor, e.g. also in case where Wi-Fi crowdsourcing is performed automatically (compared to known manual collection and/or manual association to one or more floor (levels)). It may, however, only be needed to keep the metadata information up-to-date This may for instance be performed and/or controlled by obtaining one or more pieces of metadata information in timely intervals. Thus, e.g. by performing and/or controlling the method according to the first exemplary aspect of the present invention, e.g. each time an update is needed.

The determined association may for instance be utilized e.g. to determine a floor level of a mobile device (e.g. mobile device 130 of FIG. 1). For instance, mobile device may for instance request its position in the venue 150 of FIG. 1 to be determined, e.g. by sending a (e.g. positioning) request.

The request may for instance be obtained, e.g. by receiving the request from the mobile device 130. The request may for instance be received by server 110 of FIG. 1. Further, the request may for instance be obtained by receiving the request via user input in case the method according to the first exemplary aspect of the present invention is performed and/or controlled by the mobile device 130 (e.g. itself). After such a request is obtained, the request may for instance determine a location estimate indicative of a position the respective mobile device 130 is located (e.g. within the venue 150). In order to determine the location estimate, the request may for instance comprise or be accompanied by a fingerprint information indicative of one or more identifying information, and optionally of one or more received signal strength values of signals sent by one or more radio nodes (e.g. radio nodes 140 of the venue 150) that are observable at the position at which the fingerprint information is gathered (e.g. measured) by the mobile device 130.

The request or the fingerprint information may for instance further comprise or represent a rough location estimate indicate of a position of the mobile device 130 which does not represent a very accurate position (e.g. accuracy of 10 to 50 m). The method according to the first exemplary aspect may for instance then be performed and/or controlled, and the result of the association may for instance then be utilized to determine (or refine) a location estimate.

The determined location estimate may for instance then be provided back to the mobile device 130 by the server 110, wherein the determined location estimate is provided to the mobile device, e.g. by outputting (e.g. sending) the location estimate to the mobile device (from which the request stems), or to another entity that is different from the mobile device (not shown in FIG. 1), which relays the location estimate to the mobile device 130.

Figure 2:
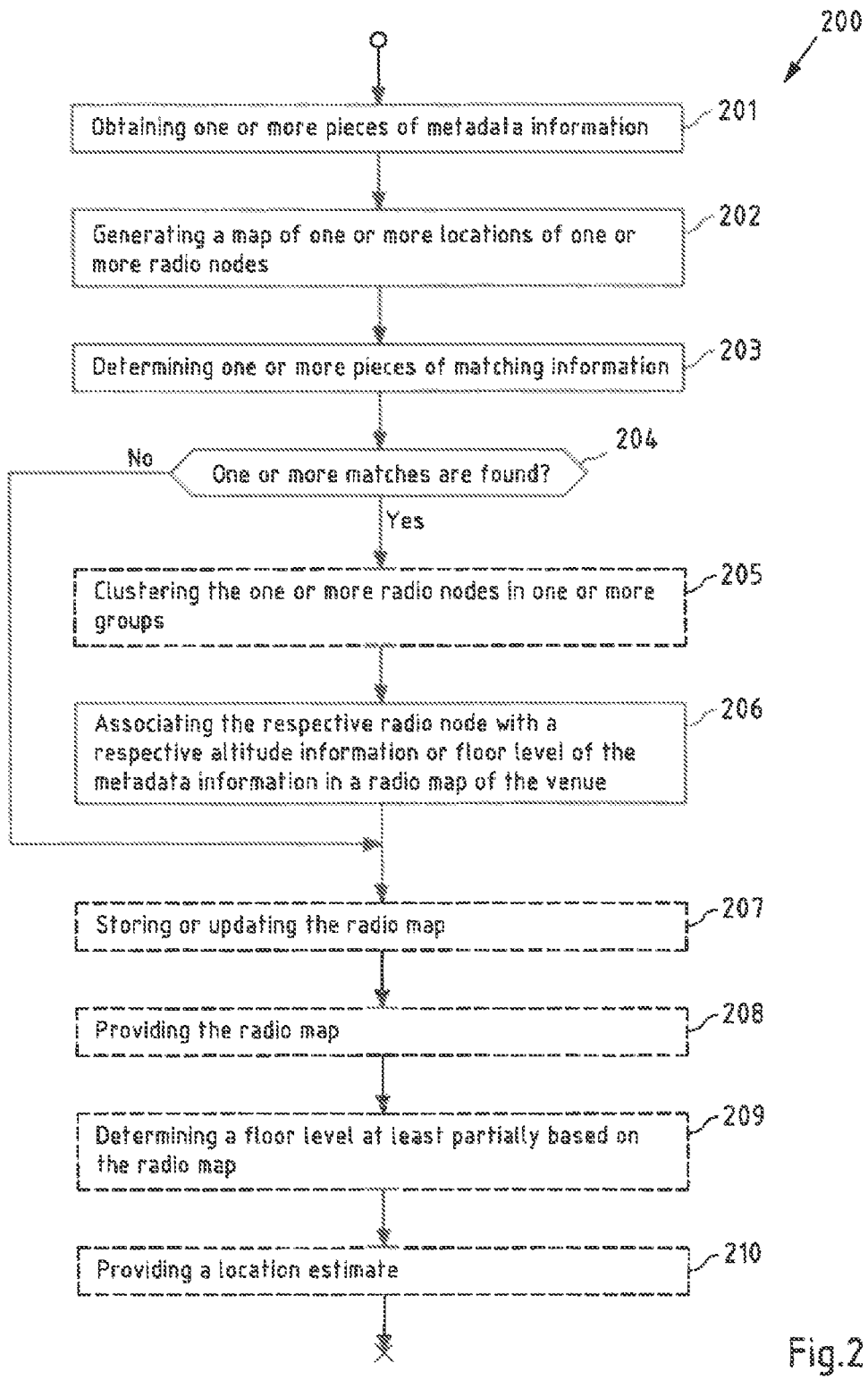
FIG. 2 a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed and/or controlled by a server (e.g. server 110 of FIG. 1). Alternatively, this method may for instance be performed and/or controlled by a mobile device (e.g. mobile device 130 of FIG. 1).

In a first step 201, one or more pieces of metadata information are obtained. The one or more pieces of metadata information may for instance be obtained, e.g. by receiving the one or more pieces of metadata information from an entity that is different from the apparatus performing and/or controlling flowchart 200. Additionally or alternatively, the one or more pieces of metadata information may for instance be obtained, e.g. by retrieving or extracting the one or more pieces of metadata information, e.g. out of third party sources (e.g. via web crawler, to name but one non-limiting example), e.g. via the internet, e.g. out of one or more available (human-readable) maps of a venue (e.g. venue 150 of FIG. 1).

In a second step 202, a map comprising or representing one or more locations of one or more radio nodes (e.g. in a venue (e.g. venue 150 of FIG. 1)) is generated. A respective location of a respective radio node of the one or more radio nodes may for instance be further associated with or comprises an altitude information or floor level at which the respective radio node may for instance be located within the venue.

In a third step 203, one or more pieces of matching information are determined, e.g. by a comparison of a respective identifying information of the one or more radio nodes with the one or more pieces of metadata information. A/each piece of matching information of the one or more pieces of matching information is indicative of whether or not a respective identifying information of the one or more radio nodes at least partially matches with at least one piece of metadata information of the one or more pieces of metadata information In a fourth step 204, it is checked whether or not a match between one or more identifying information of the one or more radio nodes and one or more pieces of metadata information, e.g. that may for instance be indicative of a certain SSID of a radio node and a certain name of a spatial location of a venue (e.g. venue 150 of FIG. 1), is found.

In an optional fifth step 205, the one or more radio nodes (e.g. of the venue or located within or within the vicinity of the venue 150 of FIG. 1) may for instance be clustered into one or more groups, wherein each group of the one or more groups may for instance be indicative of a specific radio data layer of the venue.

In case such a match is not found, it may for instance be continued with any of the steps 208 to 210. It will be understood that some of the steps 208 to 210 may for instance be performed and/or controlled only in case a requirement of the respective step is given. For instance, step 208 of providing a radio map may for instance only be performable and/or controllable in case a radio map is already available for provision.

In case such a match is found in step 204, e.g. step 206 is performed and/or controlled. In a sixth step 206, the respective radio node (e.g. found in the matching of step 204) is associated with a respective altitude information or floor level (or floor level identifier) of the respective metadata information in a radio map of the venue.

In an optional seventh step 207, the radio map (e.g. with the association of step 206) is stored. In case a radio map of the venue does already exist, this radio map may for instance be updated with the association of the step 206.

In an optional eighth step 208, the radio map is provided, e.g. by outputting (e.g. sending) the radio map, e.g. to one or more entities, such as one or more mobile devices, or one or more servers for providing location-based services, which can then e.g. utilize the radio map comprising the association of step 206 in order to determine a floor level (human-readable), e.g. in case a mobile device requests is position to be determined (e.g. a location estimate of its position in the venue or within the vicinity of the venue).

In an optional ninth step 209, a floor level is determined at least partially based on the radio respectively an association of step 206 comprised by the radio map. For instance, the floor level determining may be part of determining a location estimate (e.g. for a respective mobile device) which may for instance have requested its position to be determined.

In an optional tenth step 210, a location estimate is provided, e.g. by outputting (e.g. sending) the (determined) location estimate to a mobile device (to name but one possible and non-limiting example) from which a request for determining a location estimate was received prior to performing and/or controlling step 209 and/or 210.

The steps 201 and 202 may for instance be performed in the above-mentioned order, e.g. at first step 201, and then step 202.

Alternatively, step 202 may for instance be performed and/or controlled prior to step 201. In this latter case, the (e.g. radio) map may for instance be generated (e.g. created). The generated respectively created (e.g. radio map) may for instance comprise a step of including the collection of one or more pieces of metadata information (e.g. one or more SSIDs of one or more radio nodes). Additionally, the generated respectively created (e.g. radio map) may for instance comprise the step 205 of clustering the one or more radio nodes (e.g. one or more access points) to different (e.g. floor) levels of a venue. This may for instance happen first. Secondly, the step 201 of obtaining (e.g. collection respectively collecting) of the one or more pieces of (e.g. floor) metadata information (e.g. obtained respectively received from one or more external sources) may for instance be performed and/or controlled. Finally, the linkage between e.g. one or more floors of a venue and/or one or more altitude levels based on the one or more pieces of metadata information and obtained (e.g. collected) e.g. SSIDs respectively SSID information of the one or more radio nodes (e.g. one or more access points) may for instance be performed and/or controlled.

Figure 5:
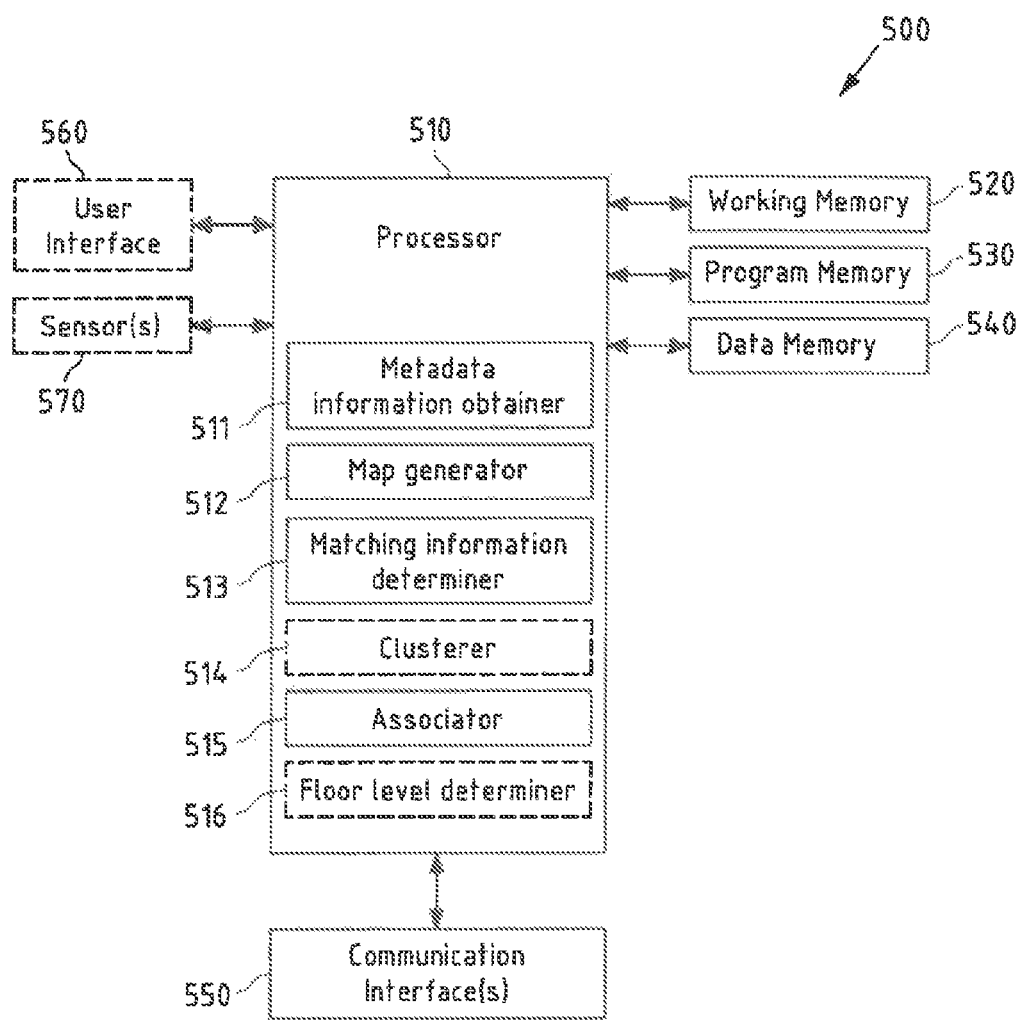
FIG. 5 a schematic block diagram of an apparatus configured to perform the method according to the first exemplary aspect of the present invention.

FIG. 5 is a schematic block diagram of an apparatus 500 according to an exemplary aspect of the present invention, which may for instance represent the server 110 of FIG. 1. Alternatively, the schematic block diagram of the apparatus 500 according to an exemplary aspect of the present invention may for instance represent mobile device 130 of FIG. 1.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the first exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the first exemplary aspect of the invention of the present invention.

Processor 510 may for instance comprise a metadata information obtainer 511 as a functional and/or structural unit. Metadata information obtainer 511 may for instance be configured to obtain one or more pieces of metadata information (see step 201 of FIG. 2).

Processor 510 may for instance comprise a map generator 512 as a functional and/or structural unit. Map generator 512 may for instance be configured to generate a map (see step 202 of FIG. 2).

Processor 510 may for instance comprise a matching information determiner 513 as a functional and/or structural unit. Matching information determiner 513 may for instance be configured to determiner one or more pieces of matching information (see step 203 of FIG. 2).

Processor 510 may for instance comprise an optional clusterer 514 as a functional and/or structural unit. The optional clusterer 514 may for instance be configured to cluster one or more radio nodes in one or more groups (see step 205 of FIG. 2).

Processor 510 may for instance comprise an associator 515 as a functional and/or structural unit. Associator 515 may for instance be configured to associate a respective radio node with an altitude information and/or floor level (see step 206 of FIG. 2).

Processor 510 may for instance comprise an optional floor level determiner 516 as a functional and/or structural unit. The optional floor level determiner 516 may for instance be configured to determine a floor level (see step 209 of FIG. 2).

Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the first exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store one or more pieces of metadata information, one or more maps, one or more pieces of matching information, one or more groups, one or more associations between one or more radio nodes and one or more altitude information or floor levels, one or more pieces of altitude information, one or more floor levels, one or more radio maps, one or more location estimates, or a combination thereof, to name but a few non-limiting examples.

Communication interface(s) 550 enable apparatus 500 to communicate with other entities, e.g. with radio nodes 140 of FIG. 1, and/or with mobile device 130 of FIG. 1 in case apparatus 500 represents server 110 of FIG. 1, and/or with server 110 of FIG. 1 in case apparatus 500 represents mobile device 130 of FIG. 1. The communication interface(s) 550 may for instance comprise a wireless interface, e.g. a cellular radio communication interface and/or a WLAN interface) and/or wire-bound interface, e.g. an IP-based interface, for instance to communicate with entities via the Internet.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a barometric sensor, e.g. to gather an altitude information. Sensor(s) may for instance be comprised by apparatus 500 in case apparatus 500 represents mobile device 130 of FIG. 1. Sensor(s) may for instance not be comprised by apparatus 500 in case apparatus 500 represents server 110 of FIG. 1.

Some or all of the components of the apparatus 500 may for instance be connected via a bus. Some or all of the components of the apparatus 500 may for instance be combined into one or more modules.

The following embodiments shall also be considered to be disclosed:

Embodiment 1

An apparatus comprising at least one processor and at least one memory including computer program code, the at least one memory and the computer program code configured to, with the at least one processor, cause the apparatus to at least perform:

obtaining one or more pieces of metadata information indicative of one or more identifiers of one or more spatial locations located within a venue, and further indicative of one or more floor level identifiers of the one or more spatial locations;

generating a map of one or more locations of one or more radio nodes and their respective one or more pieces of identifying information, wherein a respective location of the one or more radio nodes is further associated with or comprises an altitude information;

determining one or more pieces of matching information, wherein each matching information of the one or more pieces of matching information is indicative of whether or not a respective identifying information of the one or more radio nodes at least partially matches with at least one metadata information of the one or more pieces of metadata information; and in case a respective matching information of the one or more pieces of matching information represents a positive result:

associating the respective radio node with a respective altitude floor level of the respective piece of metadata information in a radio map of the venue.

Embodiment 2

The apparatus according embodiment 1, the at least one memory and the computer program code configured to, with the at least one processor, cause the apparatus further to perform:
clustering the one or more radio nodes in one or more groups, wherein each group of the one or more groups is indicative of a specific radio data layer of the venue, wherein the one or more radio nodes are clustered in the one or more groups based on an observable signal strength of the respective radio node; and
wherein the matching information is determined further at least partially based on the one or more groups.

Embodiment 3

The apparatus according to embodiment 2, wherein the clustering is performed and/or controlled at least partially based on a pre-determined or determined to pre-defined rules signal strength threshold value (e.g. for determining of clusters).

Embodiment 4

The apparatus according to any of the preceding embodiments, wherein the one or more pieces of metadata information are obtained from an indoor map of the venue, wherein at least a part of the indoor map of the venue comprises or represents one or more identifiers of one or more spatial locations located within a venue, and at least one further part of the indoor map comprises or represents one or more pieces of altitude information associated with at least one of the one or more spatial locations.

Embodiment 5

The apparatus according to any of the preceding embodiments, wherein the one or more radio nodes are access points located within the venue.

Embodiment 6

The apparatus according any of the preceding embodiments, the at least one memory and the computer program code configured to, with the at least one processor, cause the apparatus further to perform:
determining a floor level at least partially based on the radio map of the venue, wherein the floor level is indicative of a floor of the venue a mobile device is located on.

Embodiment 7

The apparatus according to any of the preceding embodiments, wherein a respective piece of metadata information of the one or more pieces of metadata information comprises or represents a MAC address, signal strength value, SSID, or a combination thereof of at least a part of the one or more radio nodes.

Embodiment 8

The apparatus according to any of the preceding embodiments, wherein the determining of the matching information further comprises a string comparison of the one or more pieces of metadata information and the one or more pieces of identifying information of the one or more radio nodes.

Embodiment 9

The apparatus according to any of the preceding embodiments, wherein a respective piece of identifying information of the one or more pieces of identifying information comprises or represents a SSID, MAC addresses, a BSS, or a combination thereof of the one or more radio nodes.

Embodiment 10

The apparatus according any of the preceding embodiments, the at least one memory and the computer program code configured to, with the at least one processor, cause the apparatus further to perform:
receiving or obtaining a request for determining a location estimate, wherein the request comprises or is accompanied by a fingerprint information; and
determining the location estimate at least partially based on the fingerprint information and the radio map of the venue.

Embodiment 11

The apparatus according to embodiment 10, wherein the location estimate is determined further based on a rough location estimate.

Embodiment 12

An apparatus comprising at least one processor and at least one memory including computer program code, the at least one memory and the computer program code configured to, with the at least one processor, cause an apparatus at least to perform and/or control the method of any of the embodiments 1 to 11.

Embodiment 13

A system, comprising:
at least one apparatus according to any of the embodiments 1 to 11, and
one or more mobile devices enabled to determine to trigger determining of a location estimate at least partially based on an associating the respective radio node with a respective altitude information or floor level of the metadata information.

Embodiment 14

A tangible computer-readable medium storing computer program code, the computer program code when executed by a processor causing an apparatus to perform and/or control:
obtaining one or more pieces of metadata information indicative of one or more identifiers of one or more spatial locations located within a venue, and further indicative of one or more floor level identifiers of the one or more spatial locations;
generating a map of one or more locations of one or more radio nodes and their respective one or more pieces of identifying information, wherein a respective location of the one or more radio nodes is further associated with or comprises an altitude information;

determining one or more pieces of matching information, wherein each matching information of the one or more pieces of matching information is indicative of whether or not a respective identifying information of the one or more radio nodes at least partially matches with at least one metadata information of the one or more pieces of metadata information; and in case a respective matching information of the one or more pieces of matching information represents a positive result:

associating the respective radio node with a respective altitude floor level of the respective piece of metadata information in a radio map of the venue.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, comprising:
    obtaining one or more pieces of metadata information indicative of one or more identifiers of one or more spatial locations located within a venue, and further indicative of one or more floor level identifiers of the one or more spatial locations;
    generating a map of one or more locations of one or more radio nodes and their respective one or more pieces of identifying information, wherein a respective location of the one or more radio nodes is further associated with or comprises an altitude information;
    clustering the one or more radio nodes in one or more groups, wherein each group of the one or more groups is indicative of a specific radio data layer of the venue, wherein the one or more radio nodes are clustered in the one or more groups based on an observable signal strength of the respective radio node;
    determining whether or not a respective identifying information of the one or more radio nodes at least partially matches with at least one metadata information of the one or more pieces of metadata;
    determining one or more pieces of matching information, wherein each matching information of the one or more pieces of matching information is determined based on a result of the determination of whether or not the respective identifying information of the one or more radio nodes at least partially matches with the at least one metadata information of the one or more pieces of metadata information and wherein the matching information is determined further at least partially based on the one or more groups; and
    when a respective matching information of the one or more pieces of matching information represents that the respective identifying information of the one or more radio nodes at least partially matches with the at least one metadata information of the one or more pieces of metadata, associating the respective radio node with a respective floor level identifier indicated by the respective piece of metadata information in a radio map of the venue.

2. The method according to claim 1, wherein the clustering is performed and/or controlled at least partially based on a pre-determined or determined to pre-defined rules signal strength threshold value.

3. The method according to claim 1, wherein the one or more pieces of metadata information are obtained from an indoor map of the venue, wherein at least a part of the indoor map of the venue comprises or represents one or more identifiers of one or more spatial locations located within a venue, and at least one further part of the indoor map comprises or represents one or more pieces of altitude information associated with at least one of the one or more spatial locations.

4. The method according to claim 1, wherein the one or more radio nodes are access points located within the venue.

5. The method according to claim 1, further comprising:
determining a floor level at least partially based on the radio map of the venue, wherein the floor level is indicative of a floor of the venue a mobile device is located on.

6. The method according to claim 1, wherein a respective piece of metadata information of the one or more pieces of metadata information comprises or represents a MAC address, signal strength value, SSID, or a combination thereof of at least a part of the one or more radio nodes.

7. The method according to claim 1, wherein the determining of the matching information further comprises a string comparison of the one or more pieces of metadata information and the one or more pieces of identifying information of the one or more radio nodes.

8. The method according to claim 1, wherein a respective piece of identifying information of the one or more pieces of identifying information comprises or represents a SSID, MAC addresses, a BSS, or a combination thereof of the one or more radio nodes.

9. The method according to claim 1, further comprising:
receiving or obtaining a request for determining a location estimate, wherein the request comprises or is accompanied by a fingerprint information; and
determining the location estimate at least partially based on the fingerprint information and the radio map of the venue.

10. The method according to claim 9, wherein the location estimate is determined further based on a rough location estimate.

11. An apparatus comprising at least one processor and at least one memory including computer program code, the at least one memory and the computer program code configured to, with the at least one processor, cause an apparatus at least to:
obtain one or more pieces of metadata information indicative of one or more identifiers of one or more spatial locations located within a venue, and further indicative of one or more floor level identifiers of the one or more spatial locations;
generate a map of one or more locations of one or more radio nodes and their respective one or more pieces of identifying information, wherein a respective location of the one or more radio nodes is further associated with or comprises an altitude information;
cluster the one or more radio nodes in one or more groups, wherein each group of the one or more groups is indicative of a specific radio data layer of the venue, wherein the one or more radio nodes are clustered in the one or more groups based on an observable signal strength of the respective radio node;
determine whether or not a respective identifying information of the one or more radio nodes at least partially matches with at least one metadata information of the one or more pieces of metadata;
determine one or more pieces of matching information, wherein each matching information of the one or more pieces of matching information is determined based on a result of the determination of whether or not the respective identifying information of the one or more radio nodes at least partially matches with the at least one metadata information of the one or more pieces of metadata information and wherein the matching information is determined further at least partially based on the one or more groups; and
when a respective matching information of the one or more pieces of matching information represents that the respective identifying information of the one or more radio nodes at least partially matches with the at least one metadata information of the one or more pieces of metadata, associate the respective radio node with a respective floor level identifier indicated by the respective piece of metadata information in a radio map of the venue.

12. The apparatus according to claim 11, wherein the at least one memory and the computer program code configured to, with the at least one processor, cause an apparatus to cluster the one or more radio nodes in one or more groups based on a pre-determined or determined to pre-defined rules signal strength threshold value.

13. The apparatus according to claim 11, wherein the one or more pieces of metadata information are obtained from an indoor map of the venue, wherein at least a part of the indoor map of the venue comprises or represents one or more identifiers of one or more spatial locations located within a venue, and at least one further part of the indoor map comprises or represents one or more pieces of altitude information associated with at least one of the one or more spatial locations.

14. The apparatus according to claim 11, wherein the at least one memory and the computer program code further configured to, with the at least one processor, cause an apparatus to:
determine a floor level at least partially based on the radio map of the venue, wherein the floor level is indicative of a floor of the venue a mobile device is located on.

15. A computer program product comprising a non-transitory computer-readable medium storing computer program code, the computer program code when executed by a processor configured to cause an apparatus at least to:
obtain one or more pieces of metadata information indicative of one or more identifiers of one or more spatial locations located within a venue, and further indicative of one or more floor level identifiers of the one or more spatial locations;
generate a map of one or more locations of one or more radio nodes and their respective one or more pieces of identifying information, wherein a respective location of the one or more radio nodes is further associated with or comprises an altitude information;
cluster the one or more radio nodes in one or more groups, wherein each group of the one or more groups is indicative of a specific radio data layer of the venue, wherein the one or more radio nodes are clustered in the one or more groups based on an observable signal strength of the respective radio node;
determine whether or not a respective identifying information of the one or more radio nodes at least partially matches with at least one metadata information of the one or more pieces of metadata;
determine one or more pieces of matching information, wherein each matching information of the one or more pieces of matching information is determined based on a result of the determination of whether or not the respective identifying information of the one or more radio nodes at least partially matches with the at least one metadata information of the one or more pieces of metadata information and wherein the matching information is determined further at least partially based on the one or more groups; and
when a respective matching information of the one or more pieces of matching information represents that the respective identifying information of the one or more radio nodes at least partially matches with the at least one metadata information of the one or more pieces of metadata, associate the respective radio node with a respective floor level identifier indicated by the respective piece of metadata information in a radio map of the venue.

16. The computer program product according to claim 15, wherein the one or more pieces of metadata information are obtained from an indoor map of the venue, wherein at least a part of the indoor map of the venue comprises or represents one or more identifiers of one or more spatial locations located within a venue, and at least one further part of the indoor map comprises or represents one or more pieces of altitude information associated with at least one of the one or more spatial locations.

17. The computer program product according to claim 15, wherein the computer program code is further configured to cause the apparatus to:
   determine a floor level at least partially based on the radio map of the venue, wherein the floor level is indicative of a floor of the venue a mobile device is located on.

* * * * *